United States Patent Office 3,340,208
Patented Sept. 5, 1967

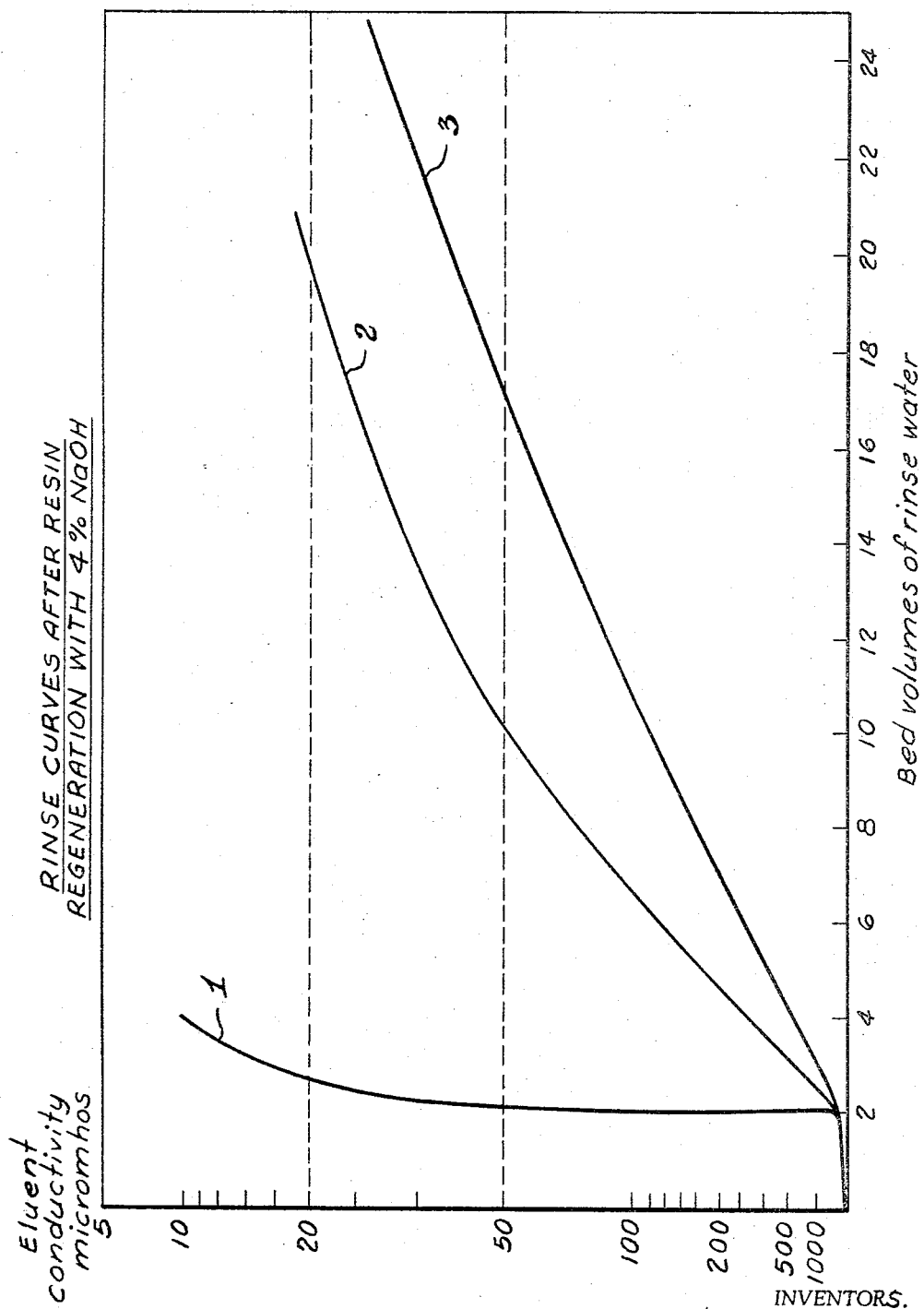

3,340,208
AMMONIA-EPICHLOROHYDRIN ANION-EXCHANGE RESINS
Robert E. Anderson and Duane F. Scheddel, Midland, Mich., assignors to The Dow Chemical Company, Midland, Mich., a corporation of Delaware
Filed Oct. 8, 1964, Ser. No. 402,572
8 Claims. (Cl. 260—2.1)

This invention relates to an improved process for the preparation of weak-base anion-exchange resins from ammonia and epichlorohydrin. More specifically it concerns a process wherein ammonia and epichlorohydrin are condensed under controlled and substantially anhydrous conditions using a halogenated aliphatic solvent as a diluent to form an insoluble, highly crosslinked resin with superior properties as an anion-exchange resin.

Weak-base anion-exchange resins are particularly useful in removing acids from solution. In conditioning water for use in a high pressure boiler, a three bed ion exchange process is commonly employed. The water is deionized by passing successively through a column of a strong-acid resin, a weak-base resin, and a strong-base resin. Critical to the economic operation of such a process is repeated reuse of the resin beds. Thus not only must the resins have adequate physical and chemical stability under process conditions, but their regeneration must be rapid and efficient with a minimum use of regenerants and water to rinse out excess regenerants.

Characteristic of weak-base resins is the ease of regeneration with dilute caustic. Normally only a slight excess of caustic is required. However, since even traces of residual caustic in the effluent from the regenerated weak-base resin are detrimental when the bed is returned to service, the resin must be thoroughly rinsed. As a sensitive control method, the conductivity of the effluent rinse water is often used. The regenerated resin is then rinsed until the eluent conductivity drops below a certain maximum level.

In U.S. Patent 3,132,112 Bartolomeo and Hefner describe a process for the preparation of a weak-base anion-exchange resin by the condensation of ammonia and epichlorohydrin under substantially anhydrous conditions at 60°–180° C. using certain inert organic solvents as a diluent. Suitable solvents are monocyclic hydrocarbons, ethers, isopropyl alcohol and t-butyl alcohol. From 0.5 to 2.0 moles of ammonia per mole of epichlorohydrin are required. The product is obtained as insoluble, free-flowing, granular, substantially spherical particles having a normal operating capacity of about 20 kilograins (kgr.) $CaCO_3$ per ft.$^3$ and adequate physical and mechanical properties for use in a resin column. Its chemical stability is superior to known commercial weak-base anion-exchange resins. However, the rinse characteristics of this resin are extremely erratic, varying widely from batch to batch in a completely random manner. For example curve 1 in the accompanying figure illustrates desirable rinse behavior with a drop in conductivity of the eluant rinse water to less than 20 mmhos with less than 3–4 bed volumes of rinse water under standard test conditions. In contrast, resin prepared by the Bartolomeo-Hefner process often requires from 10 to 20 or more bed volumes of rinse water, curves 2 and 3 being typical. Such resin is therefore unacceptable for commercial water conditioning units, even though in all other respects it is a most satisfactory resin.

An extensive study of numerous resin samples having widely different rinse characteristics revealed no significant chemical differences in resin composition. Attempts to improve the rinse characteristics by various chemical treatments of the resins resulted in no permanent change. Measurement of the surface area and porosity of the samples revealed very few microcapillary pores in the resin structure and no correlation of these properties and the rinse volumes. Yet it was found that the rate of removal of residual caustic is very dependent on the concentration of the regenerant, but is largely independent of the rinse water flow rate. Also sodium chloride is retained in a similar manner, the rinse behavior of a column treated with NaCl being essentially the same as with caustic of a similar concentration.

These observations indicate that the poor rinse characteristics are caused by a slow, diffusion controlled release of caustic during the rinse cycle. When examined with an electron microscope, the poor resins were found to have numerous, very small, isolated holes bounded by nearly spherical areas of very dense polymer. Similar defects are not found in resin samples with acceptable rinse characteristics.

While the cause of these isolated holes and dense surrounding polymer is not completely understood, they do provide a feasible explanation of the poor rinse behavior. In the presence of a relatively concentrated caustic regenerant solution, the caustic diffuses rapidly through the polymer into the small holes. The rinse water quickly removes residual caustic entrained between the resin particles and on the particle surface. But the caustic trapped in the holes diffuses only slowly out into the rinse water. Also as the concentration of residual trapped caustic drops, the rate of diffusion becomes even slower. Supporting this mechanism is the observation that soaking a partially rinsed poor resin for several hours in the rinse water gives a very rapid subsequent removal of the residual caustic.

IMPROVED AMMONIA-EPICHLOROHYDRIN RESIN PROCESS

An improved process has now been discovered for the preparation of weak-base anion-exchange resins from ammonia and epichlorohydrin whereby the desirable properties of the Bartolomeo and Hefner resin are retained in addition to improved and consistent rinse characteristics and a high operating capacity. Essential elements in the improved process are: (1) Using a polyhalo $C_1$–$C_3$ aliphatic hydrocarbon having a boiling point of 20°–120° C. and a density of 1.1–1.7 at 25° C. as a reaction diluent; (2) adding a total of 0.67 to 1.75 moles of ammonia per mole of epichlorohydrin to a mixture of epichlorohydrin and diluent under substantially anhydrous conditions at a reaction temperature of 40°–100° C.; and (3) completing the reaction at 40°–100° C. The resulting ammonia-epichlorohydrin resin are hard, free-flowing, granular particles with minimum operating capacities of about 20–25 kgr. $CaCO_3$ per ft.$^3$ and a rinse volume of 3–5 bed volumes under standard test conditions.

A critical element in the present invention is the use of a liquid polyhalo $C_1$–$C_3$ aliphatic hydrocarbon as a reaction diluent. The suitable diluents are further characterized by a boiling point of 20°–120° C. and a density of 1.1–1.7 at 25° C. Preferred are diluents having a boiling point below 100° C. because of the greater ease in stripping the residual diluent from the resinous product. Furthermore the diluent must be inert to the reactants and products under the normal reaction conditions. Also to achieve the desired granular resin, the condensation must be carried out under substantially anhydrous conditions. However, small amounts of water sometimes encountered with the diluent can be tolerated provided that it is less than about 1% based on the weight of diluent. Larger amounts of water result in inferior soft resins.

Among the suitable diluents are carbon tetrachloride, chloroform, 1,1-dichloroethane, 1,2-dichloroethane, 1,2-dischloropropane, methylene chloride, 1,1,1-trichloroethane, 1,1,2 - trichloroethane, trichlorofluoromethane, 1,1,2,trichloro - 1,2,2 - trichloroethane, and 1,1,2,2,tetrachloro-1,2-difluoroethane. Preferred because of availability, stability, and ease of recovery is methylene chloride.

In the improved process the reactor is charged with epichlorohydrin and diluent and then heated with stirring to a reaction temperature in the range from 40–100° C. With methylene chloride a temperature of 60–85° C. is preferred. Then anhydrous ammonia is added to saturate the reaction mixture and develop a partial pressure of up to about 6 atmospheres of ammonia in the reactor. Thereafter the uptake of ammonia is slow for an induction period of up to several hours. Then an exothermic reaction occurs followed by a rapid and smooth uptake of ammonia until the desired amount has been added. Control of the reaction temperature during the ammonia addition and particularly during the exothermic reaction is important. Since the reaction rate is dependent on the ammonia pressure, control of the rate of ammonia addition as well as efficient mixing and cooling is helpful in preventing overheating. Finally to complete the reaction and develop optimum properties, the reaction mixture is digested for another 1–3 hours at the reaction temperature or advantageously at 85–100° C. Completion of the reaction is readily apparent from the drop in total pressure and by inspection of a sample of the polymer.

The granular ammonia-epichlorohydrin condensation polymer is recovered by conventional means. Conveniently, after the reactor is cooled, the liquid diluent mother liquor is drained from the polymer. Sufficient water is added to form a fluid slurry and the mixture heated to strip residual solvent. Then the product is recovered for storage or use.

REACTION CONDITIONS

The interaction of the diluent during the polymerization process is both critical and complex. Not only does the resin prepared using a polyhalo $C_1$–$C_3$ aliphatic diluent have more uniform rinse characteristics, but it has been found that the formation of resinous particles occurs more readily with these diluents than with benzene or toluene. It is believed that this polymerization of epichlorohydrin and ammonia proceeds with initial formation of a soluble polymer which through further polymerization is transformed into small, insoluble, highly crosslinked particles. The small particles remain suspended in these diluents and gradually agglomerate into fairly uniform sized resinous granules.

The relative volume of diluent and epichlorohydrin is important. In practice from 2–10 and preferably from 2–5 volumes of diluent per volume of epichlorohydrin are used. With less than 2 volumes of diluent, the product is obtained as particles too fine for use in an ion exchange column. With more than 10 volumes of diluent, the reaction rate becomes undesirably slow.

The diluent also affects the optimum reaction conditions. While a reaction temperature of 40°–100° is generally suitable, a temperature of 60°–85° C. is preferred during the addition of ammonia when methylene chloride is used as the diluent. Furthermore, the partial pressure of the diluent contributes to the total reaction pressure and solvent reflux can provide added means for control of the initial exothermic reaction.

To maintain the necessary temperature control, the ammonia is added gradually to the mixture of epichlorohydrin and diluent with a maximum total pressure of about 8 atmospheres (120 p.s.i.g.). An ammonia pressure of 1–5 atmospheres is generally adequate. Since the composition of the desired resinous product corresponds approximately to the condensation of 2 moles of ammonia and 3 moles of epichlorohydrin, the addition of a minimum of 0.67 mole of ammonia per mole of epichlorohydrin is required. However, higher capacity resins are obtained if a greater amount of ammonia is used up to about 1.75 moles of ammonia per mole of epichlorohydrin. With an ammonia ratio greater than 1.75, the final resin is extremely brittle and unsuited for ion exchange columns. Thus in practice preferred results are obtained by using from 1.0–1.75 moles of ammonia per mole of epichlorohydrin.

The digestion period after adding the ammonia to the reactor is desirable to complete the reaction and achieve optimum resin properties. Normally heating at the reaction temperature, or preferably at 85°–100° C., from about 1–3 hours gives substantially complete reaction is indicated by the drop in the reactor pressure and the resin properties. Then the reactor is cooled, the mother liquor removed and the product washed and recovered.

The mother liquor which contains a small amount of soluble polymeric material can be processed to recover the diluent. However, it can be advantageously recycled with added makeup diluent in another run. It has been found that recycling 1–2 parts of mother liquor per part of new or recovered diluent gives a much smoother reaction, markedly reducing the induction period and permitting a more rapid addition of ammonia. In some runs, the ammonia addition time has been cut 30–40% by the recycle of mother liquor.

PRODUCT DESCRIPTION

The weak-base ammonia-epichlorohydrin resin prepared by the present process is essentially identical chemically with that of the Bartolomeo and Hefner process. It is a dense, highly crosslinked polymer. Elemental analyses of the insoluble resin in free base form correspond closely to that calculated for the reaction:

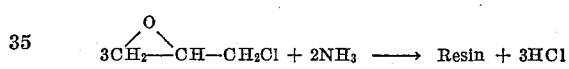

In accord with the hard, infusible and insoluble nature of the resins, this stoichiometry indicates a highly crosslinked structure. Further support for a high degree of crosslinking is the fact that at least 90% of the total nitrogen is present as tertiary amino groups.

These properties are in sharp contrast with the physical and chemical characteristics of amine-epichlorohydrin resins prepared in aqueous systems. For example in U.S. Patent 2,469,683 Dudley and Lundberg describe the condensation of epichlorohydrin and an alkylene polyamine in an aqueous system to form an initial homogeneous gel which is then thermally cured to a water insoluble resin. In U.S. Patent 2,610,156 Lundberg teaches the use of an organic non-solvent as a suspending medium for preparing a resinous product from a prepolymer prepared in aqueous solution. More recently Kekish in U.S. Patent 3,137,659 has employed a similar technique to prepare an insoluble resin from aqueous ammonia and epichlorohydrin. These resins prepared by at least partial condensation in an aqueous system are essentially clear, homogeneous, microporous gels.

In contrast to the homogeneous gels obtained by an aqueous polymerization process, the substantially anhydrous processes described by Bartolomeo and Hefner and herein yield opaque, heterogeneous, agglomerated resinous particles. The physical difference in these resins is apparent even on visible inspection. It is more pronounced when the particles are magnified. The difference is further reflected in the greater dimensional stability of the more highly crosslinked resins prepared under substantially anhydrous conditions. Whereas the resins prepared in an anhydrous system contain at least 85–90% tertiary amino groups based on total amine content, the gel resins prepared from ammonia and epichlorohydrin in an aqueous process contain a much greater proportion of primary and secondary amino groups.

In summary, an improved process has been described for the preparation of a new and useful weakly-basic anion exchange resin by the condensation of ammonia and epichlorohydrin in the presence of a polyhalo $C_1$-$C_3$ aliphatic hydrocarbon diluent having a boiling point between 20–120° C. and a density of 1.1 to 1.7 at 25° C. The resulting highly cross-linked, agglomerated, resinous polymer contains in basic form about 13–15 wt. percent total nitrogen with at least 85–90% present as tertiary amino groups. It is readily prepared as generally spherical particles having a size suitable for use in conventional ion exchange units. Because of superior chemical and thermal stability as well as good rinse characteristics and a high operating capacity, the improved ammonia-epichlorohydrin resin is particularly suitable for use in commercial ion exchange units for deionization of water.

To illustrate further the present invention, the following examples are given without restricting the invention thereby. Unless otherwise specified, all parts and percentages are by weight.

*Example 1.—Methylene chloride diluent*

A 6–1 stainless steel pressure vessel equipped with an anchor stirrer, suitable apertures for the addition and removal of reactants, a thermocouple for measuring the reaction temperature and a water jacket with steam and water inlets automatically controlled by a regulator responsive to the internal reaction temperature was charged with 1.2 l. (1415 g., 15.3 moles) of epichlorohydrin and 2.4 l. of methylene chloride. After sealing the reactor, the mixture was stirred at 85 r.p.m. and heated to 70° C. Then gaseous ammonia was introduced to increase the reactor pressure from 35 to 90 p.s.i.g. Thereafter further ammonia was added at a rate sufficient to maintain a total pressure of 90 to 105 p.s.i.g., the reaction temperature varying from 68°–72° C. After about 90 minutes an exothermic reaction occurred. By control of the rate of ammonia addition and use of cooling water, the reaction temperature was maintained at 70±2° C. About 5 hrs. was required for the addition of 300 g. (17.5 moles) of ammonia. Then the mixture was digested at 85°–90° C. for an hour to complete the reaction. After cooling and venting the reactor, the product slurry was removed and the solvent phase decanted. Water was added to the product and the mixture heated at 90–95° C. to remove residual methylene chloride. Draining the water gave a hard, opaque, granular product which rapidly dried into free-flowing particles.

The granular resinous product was in the form of irregular, but generally spherical particles of fairly uniform size having a screen analysis of:

| U.S. Standard Mesh: | Percent |
|---|---|
| +30 | 18.6 |
| −30+40 | 67.2 |
| −40+45 | 11.2 |
| −45 | 3.0 |

Under a microscope the resin particles appear as agglomerates of partially fused numerous small particles. Electron micrographs of microtome sections cut from a sample of resin cast in a clear plastic matrix reveals no small voids bounded by nearly spherical areas of dense polymer which characterized previous resins with poor rinse characteristics.

Using a portion of resin converted into free base form by treatment with 4 wt. percent caustic, the rinse volume and operating capacity of the resin were determined by standard procedures. As shown in the accompanying figure (curve 1) this resin required only 2.1 bed volumes of rinse water to reduce the conductivity of the rinse eluent below 50 mmhos and 2.7 bed volumes to below 20 mmhos. Furthermore the resin had an operating capacity of 1.57 meq./ml. or 34.2 kgr. $CaCO_3/ft.^3$. In an accelerated oxidative stability test, another sample of resin in free base form was held in aerated water at 95°–100° C. for two weeks without detectable change in either the rinse volume or operating capacity.

Another portion of the resin in free base form was dried in vacuo and an elemental analysis obtained.

Found: C, 53.4; H, 8.9; N, 14.5; O, 23.2.

This analysis agrees reasonably well with that calculated for $C_9H_{18}N_2O_3$, a condensation of 2 moles of ammonia and 3 moles of epichlorohydrin:

Calcd: C, 53.45; H, 8.97; N, 13.85; O, 23.73.

Furthermore of the total nitrogen content, 0.8% was primary, 7.9% secondary and 91.3% tertiary amino groups.

Similar analyses of other insoluble ammonia-epichlorohydrin resins made by the Bartolomeo and Hefner process and the present modification, indicate that these resins are generally characterized by 13.5–15.0 wt. percent total nitrogen in free base form and by a minimum of 85–90% tertiary amino groups.

*Standard tests.*—In determining the rinse volume and operating capacity of the weak-base resins described herein, the following standard procedure was used. A 1″ by approximately 36″ column of resin in salt form is prepared and converted into the free base form by passing through the column a slight excess of 4 wt. percent caustic. The caustic solution is drained to the top of the resin bed. Then deionized rinse water is passed through the column at a constant feed rate of 25 ml./min. and the effluent conductivity measured. The volume of rinse water required to reduce the conductivity of the effluent below a maximum of 50 mmhos is a sensitive measure of the rinse characteristics of the resin. However, the precise flow rate or maximum conductivity level is not a critical variable in evaluating different resins tested under similar conditions. To measure the operating capacity of the resin in free base form, dilute 0.02–0.04 N HCl is passed through the column of rinsed resin until an increase in conductivity of the effluent above 50 mmhos indicates column breakthrough.

*Example 2.—Recycled mother liquor*

The reactor described in Example 1 was charged with 1 l. (1180 g.; 12.7 moles) of epichlorohydrin, 1.5 l. of methylene chloride and 1.5 l. of methylene chloride mother liquor from a previous run. A total of 250 g. (14.7 moles) of ammonia was added over 5 hours at 70° C. and a total pressure of 60–65 p.s.i.g. The reaction mixture was then heated at 85° C. for 1 hr. After cooling to below 40° C. the mother liquor drained from the reactor, water was added, and the aqueous slurry heated to 90° C. to remove residual solvent.

The recovered resin had the following properties:

| Particle size, U.S. mesh: | Percent |
|---|---|
| +20 | 8 |
| −20+30 | 74 |
| −30+40 | 18 |

Rinse volume: 2.7 bed volumes to 50 mmhos
Operating capacity: 1.36 meq./ml.; 28.0 kgr. $CaCO_3/ft.^3$

*Example 3*

The reaction described in Example 1 was repeated in a 10 gal. reactor using 22.1 lbs. (0.24 mole) of epichlorohydrin and 74 lbs. of methylene chloride (3 volumes based on epichlorohydrin). The mixture was heated to 60° C., vented to remove air and then heated to 70° C. The pressure at 70° C. was about 18 p.s.i.g. Then 4.1 lbs. (0.24 mole) of ammonia was added over 2.7 hrs. with a reaction temperature of 70° C. and a maximum pressure of 60 p.s.i.g. After the ammonia addition the reaction mixture was digested for 1.5 hrs. at 90–95° C. to complete the reaction.

The recovered granular resinous product had a typical operating capacity of 44 kgr. $CaCO_3/ft.^3$ and a required less than 3 bed volumes of rinse water. Its particle size was suitable for use in ion exchange columns.

*Example 4.—Reaction conditions*

Table 1 summarizes data from a series of runs made using the general procedure of Example 1 and methylene chloride as the diluent to examine the effect of solvent ratio, reaction temperature and pressure, and the amount of ammonia. With methylene chloride optimum properties are obtained with a reaction temperature of 60°–85° C. during the ammonia addition. Within reasonable limits the rate of agitation was not a critical factor in the formation of a granular resin of suitable particle size. These observations have been verified in larger reactors.

TABLE 1.—REACTION CONDITIONS

| | Conditions | | | | | Resin Properties | | | | |
|---|---|---|---|---|---|---|---|---|---|---|
| | Solvent Ratio [2] | $NH_3$ Ratio [3] | T.° C. | Pressure, p.s.i.g. | $NH_3$ Addn., hrs. | Rinse Volume [1] | | Op. Capacity kgr. $CaCO_3/ft.^3$ | Predominate Size U.S. Standard Mesh | |
| | | | | | | 50 mmho, bv. | 20 mmho, bv. | | | |
| 1 | 2.0 | 1.14 | 70 | 90–105 | 5.0 | 2.1 | 2.7 | 34.4 | −30+40 | 67% |
| 2 | [4] 3.0 | 1.14 | 70 | 60 | 5.0 | 2.7 | 3.7 | 29.6 | +30 | 82% |
| 4–1 | 2.0 | 1.14 | 60 | 45–55 | 6.3 | | 2.3 | 34.5 | −30+45 | 62% |
| 4–2 | 2.0 | 1.14 | 70 | 50–65 | 6.0 | 2.1 | 3.1 | 28.5 | −30+40 | 78% |
| 4–3 | 2.0 | 1.7 | 70 | 80–90 | 4.3 | | 2.6 | 38.5 | −30+40 | 78% |
| 4–4 | 3.0 | 1.14 | 70 | 60 | | | 4.3 | 27.6 | +30 | 64% |
| 4–5 | [4] 3.0 | 1.14 | 70 | 60 | 4.0 | 2.5 | 3.6 | 29.5 | +40 | 94% |
| 4–6 | [4] 3.0 | 1.37 | 70 | 60 | 12.0 | 3.4 | 5.3 | 19.6 | | |
| 4–7 | 4.0 | 1.14 | 70 | 45–65 | 3.3 | 2.8 | 3.7 | 18.4 | −14+30 | 84% |

[1] Bed volumes (bv.).
[2] Volume ratio methylene chloride/epichlorohydrin.
[3] Mole ratio $NH_3$/epichlorohydrin.
[4] 50% mother liquor from prior run.

*Example 5.—Other solvents*

The suitability of other polyhalo $C_1$–$C_3$ aliphatic hydrocarbon solvents is shown in Table 2. In these runs the general procedure of Example 1 was used with a standard 3 volumes of solvent per volume of epichlorohydrin. A total of 1.14 moles of ammonia per mole of epichlorohydrin was added over 4 hours at 70° C. with a maximum total pressure of 60–65 p.s.i.g. Then the mixtures were digested for about an hour at 85–95° C. While these conditions were not optimum for each solvent, the resulting resins had good rinse properties and suitable operating capacities. There was a noticeable difference in the physical appearance of the resins made in the various solvents.

TABLE 2.—CHLORINATED SOLVENTS

| Run | Solvent | B.P. ° C. | Sp. gr.[25] | Resin Properties | | | |
|---|---|---|---|---|---|---|---|
| | | | | Rinse Volume | | Capacity kgr. $CaCO_3/ft.^3$ | Particle appearance |
| | | | | 50 mmho, bv. | 20 mmho, bv. | | |
| 1 | Methylene chloride | 39.8 | 1.320 | 2.1 | 2.7 | 34.4 | Hard, granular. |
| 4–1 | Chloroform | 61 | 1.476 | 2.5 | 2.9 | 29.4 | White, gritty. |
| 4–2 | Carbon tetrachloride | 76.5 | 1.589 | 3.5 | 4.6 | 20.6 | Soft. |
| 4–3 | 1,2-dichloroethane | 83.5 | 1.250 | 2.8 | 4.5 | | Very fine, hard. |
| 4–4 | Freon 113 [1] | 47.6 | 1.563 | 2.2 | 3.0 | 20.4 | White, flaky. |

[1] 1,1,2-trichloro-1,2,2-trifluoroethane.

We claim:
1. In a process for preparing a granular weak-base anion-exchange resin by the condensation of ammonia and epichlorohydrin under substantially anhydrous conditions, the improvement which comprises:
   (A) Adding ammonia to an agitated mixture of epichlorohydrin and from 2 to 10 volumes, based on the volume of epichlorohydrin, of a polyhalo $C_1$–$C_3$ aliphatic hydrocarbon diluent at a reaction temperature of 40°–100° C., said diluent having a boiling point of 20°–120° C. and a density of 1.1–1.7 at 25° C.;
   (B) Continuing the addition of ammonia to the reaction mixture at a temperature of 40°–100° C. until from 0.67 to 1.175 moles of ammonia per mole of epichlorohydrin is added; and then
   (C) Maintaining a reaction tempearture of 40°–100° C. until the polymerization is substantially complete.

2. The process of claim 1 wherein the diluent is methylene chloride.

3. The process of claim 1 wherein the diluent is chloroform.

4. The process of claim 1 wherein the diluent is carbon tetrachloride.

5. The process of claim 1 wherein the diluent contains recycle mother liquor from a previous run.

6. The process of claim 2 wherein from 2–5 volumes of methylene chloride are used per volume of epichlorohydrin.

7. The process of claim 6 wherein the reaction temperature during the addition of ammonia is 60°–85° C.

8. The process of claim 7 wherein after the addition of ammonia, the process is completed at 85°–100° C.

References Cited

UNITED STATES PATENTS 3,132,112  5/1964  Bartolomeo et al. _____ 260—2.1
3,137,659  6/1964  Kekish _____ 260—2.1

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,340,208  September 5, 1967

Robert E. Anderson et al.

It is hereby certified that error appears in the above numbered patent requiring correction and that the said Letters Patent should read as corrected below.

Column 8, line 7, for "1.175" read -- 1.75 --.

Signed and sealed this 15th day of October 1968.

(SEAL)
Attest:

Edward M. Fletcher, Jr.
Attesting Officer

EDWARD J. BRENNER
Commissioner of Patents